US012346456B2

(12) United States Patent
Ferreira Dos Santos et al.

(10) Patent No.: US 12,346,456 B2
(45) Date of Patent: Jul. 1, 2025

(54) METHOD AND SYSTEM FOR BLOCKING A TICKET-BASED COMPUTER SYSTEM

(71) Applicants: Softi9 Inovação Informática LDA, Aveiro (PT); Universidade De Aveiro, Aveiro (PT)

(72) Inventors: João Gabriel Ferreira Dos Santos, Plovdiv (BG); André Zúquete, Aveiro (PT); Miguel Nuno Rocha, Vila Real (PT); António Pedro Pinheiro De Sousa Campos, Aveiro (PT); Paulo José Barreira De Jesus, Aveiro (PT)

(73) Assignees: Softi9 Inovação Informatica LDA, Aveiro (PT); Universidade De Aveiro, Aveiro (PT)

( * ) Notice: Subject to any disclaimer, the term of this patent is extended or adjusted under 35 U.S.C. 154(b) by 0 days.

(21) Appl. No.: 18/849,682

(22) PCT Filed: Dec. 30, 2022

(86) PCT No.: PCT/IB2022/062937
§ 371 (c)(1),
(2) Date: Sep. 23, 2024

(87) PCT Pub. No.: WO2023/180804
PCT Pub. Date: Sep. 28, 2023

(65) Prior Publication Data
US 2025/0111058 A1    Apr. 3, 2025

(51) Int. Cl.
*G06F 21/57* (2013.01)
*G06F 21/30* (2013.01)

(52) U.S. Cl.
CPC ......... *G06F 21/577* (2013.01); *G06F 21/305* (2013.01); *G06F 21/575* (2013.01)

(58) Field of Classification Search
CPC ..... G06F 21/577; G06F 21/305; G06F 21/575
See application file for complete search history.

(56) References Cited

U.S. PATENT DOCUMENTS 6,834,351 B1 * 12/2004 Kabenjian ............. G06F 21/572
  707/999.009
9,529,602 B1 * 12/2016 Swierk ................ G06F 9/45558
  (Continued)

FOREIGN PATENT DOCUMENTS

EP    3098744    11/2016

OTHER PUBLICATIONS

International Search Report and the Written Opinion Dated Apr. 14, 2023 From the International Searching Authority Re. Application No. PCT/IB2022/062937. (10 Pages).

*Primary Examiner* — Zahid Choudhury (57) ABSTRACT

The present document discloses a method and system for blocking a computer system based on tickets issued by a remote server, with an operating system configured for booting from a UEFI, wherein the blocking system comprises: a transfer engine, i.e. an agent, of tickets comprised in an application or module of the operating system; an authentication engine comprised in said UEFI; a data or file transfer area accessible by both engines; wherein the transfer engine is configured for receiving tickets and storing tickets; wherein the authentication engine is configured for: reading a stored ticket; checking authentication and obtaining read ticket type; and if the authenticity is verified, processing the verified ticket, depending on the type: a normal ticket, setting the system to a leased state wherein the operating system can start; or a block ticket, setting the system to a blocked state wherein the operating system cannot boot.

19 Claims, 4 Drawing Sheets

(56) References Cited

U.S. PATENT DOCUMENTS

| | | | | |
|---|---|---|---|---|
| 12,067,111 B2* | 8/2024 | Saroiu | ............... | G06F 21/6218 |
| 2019/0243630 A1* | 8/2019 | England | ............... | G06F 21/554 |
| 2020/0279041 A1* | 9/2020 | Endler | ............... | G06F 21/554 |
| 2022/0198018 A1* | 6/2022 | Wentz | ............... | H04L 9/3268 |

* cited by examiner

METHOD AND SYSTEM FOR BLOCKING A TICKET-BASED COMPUTER SYSTEM

RELATED APPLICATIONS

This application is a National Phase of PCT Patent Application No. PCT/IB2022/062937 having International filing date of Dec. 30, 2022, which claims the benefit of priority of Portugal Patent Application No. 117865 filed on Mar. 22, 2022. The contents of the above applications are all incorporated by reference as if fully set forth herein in their entirety.

FIELD AND BACKGROUND OF THE INVENTION

The present description concerns a computer blocking method for various types of computer systems, namely computers, laptops and other portable devices, for example, tablets and mobile phones, and respective blocking system.

Solutions used today have several limitations, for example, they only guarantee the protection of computer systems from the operating system installed thereon, generally Windows™ and depend exclusively on the real-time clock of the computer system.

Protection against manipulations of the real-time clock is normally one of the main problems faced by any boot control solution with time limits, with the use of external services as a source of reliable time being common, thus consuming more memory resources.

Technologies based on a TPM physical chip intended to combat the theft of laptop computers, provide the following services: tracking a laptop computer running this technology, protecting data stored on the hard drive of a laptop computer and the remote blocking of the laptop computer. However, these solutions have several drawbacks, namely, the tracking thereof is done by sharing the IP address, which is not a precise and reliable location means, and the cipher key used to encrypt files is stored in a secure hardware place and in case the laptop is in the blocked mode, the key shall be inaccessible.

Technologies based on scanning and restoring software elements make it possible to block, locate and protect data from stolen mobile devices running the Windows™ operating system. However, these solutions could be designed for one operating system.

Software-based technologies that allow remotely locating and blocking a lost or stolen device, as well as recovering or deleting data. As these solutions do not have any hardware or firmware components, an attacker can completely remove this software whether the device is blocked or not, by replacing or formatting the hard drive.

These facts are described in order to illustrate the technical problem solved by the embodiments of the present document.

SUMMARY OF THE INVENTION

One of the purposes of this disclosure refers to a computational system for detecting theft or non-compliance with current contractual situations, concluded between the buyer and the seller of the equipment, or between the hirer and the lessee of the equipment and a block of the respective operating system.

Protection is provided by functionally disabling, or blocking, the boot of the operating system, of any kind, after detecting the occurrence of said violation. The incapacitation is reversed when the necessary actions are taken to end the violation that caused it.

The present description concerns a computer blocking system to be embedded in fundamental and non-modifiable components of computer systems.

Therefore, a computer blocking system partially embedded in chips with software/firmware for booting computer systems is presented. This system allows the autonomous deactivation of the computer system, while being simultaneously resistant to unauthorized unblocking/deactivation attempts. Taking advantage of the software/firmware run during the computer system boot by UEFI (Unified Extensible Firmware Interface), or equivalent system, that is, a system that acts before the boot of the operating system, being independent thereof. But the main innovation of this system consists in the fact that it makes decisions autonomously based on previously provided parameters. This system makes it possible to block the boot of a computer system whose owner has not fulfilled a requirement that allows him to continue using it. This requirement could be the authorized possession of the computer system or the payment of an outstanding amount, for example.

The system comprises a boot control module embedded in the software or firmware chips for booting the operating system of a mobile technological device, such as a tablet or phone. In this way, it allows the functionality of disabling their use autonomously and being resistant to unauthorized unblocking/disabling attempts.

Taking advantage of the software/firmware based on the Unified Extensible Firmware Interface (UEFI) specifications, a boot control module was developed for UEFI that operates in the primordial boot of a computer system. This always occurs before the boot of any operating system thereon, thus making it independent of the operating system used on the computer system.

A distinct aspect of the present description is that the described module does not need to communicate with external third entities or services to block a device. According to pre-defined parameters at the time of its installation, which can be updated on each computer system boot, the module described autonomously makes the decision to let booting proceed or to block the computer system without the need to make any contact with third parties.

Another advantage of this solution is that the decisions of the module described, in the case of dealing with boot authorizations with time limits, do not depend exclusively on the real-time clock of the computer system, which can thus be manipulated, without this irreversibly affecting the effectiveness of the security check carried out.

Another advantage of this system is that it can be implemented using functional firmware standards across heterogeneous hardware, namely the UEFI standard, so it can be used on any hardware that has the requirements established by the UEFI specifications.

In another embodiment, the module described for UEFI is implemented in appropriate hardware.

Another advantage in terms of security is that this system protects itself against attempts to change the software/firmware version of the module described. It will only be possible to update its software/firmware if its control functionality is not active, that is, if it is not making the decision, on each boot of the computer system, whether it should proceed with the booting or not.

Third-party communication with the described module, installed in the base infrastructure of the computer system, for example on the motherboard, is carried out by sending data blocks, designated as tickets, with information produced by an authorized and duly authenticated source. The module described verifies the authenticity of the tickets sent to it and only uses the information thereof if it is authentic, that is, if it comes from a known and authorized source, and correctly addressed, that is, addressed to the relevant computer system and its current state of operation. Tickets intended for one computer system can never be used on another. Tickets already used in a computer system cannot be reused in the same system as well.

Subsequently to a blocking situation of a computer system at its boot, due to the action of the module described, the computer system must be unblocked by the user by introducing an unblock code that shall only be valid on that machine and on that moment, and which cannot be reused on the same machine, or any other. This unblocking code will be provided by the manager of the described authorized source, which is the entity managing the ticket issuing. Upon verification of conditions previously agreed between the user of the computer system and the manager of the described authorized source, the user will be given an 11-digit unblock code estimated from information provided by the own user from the block screen, and from information only detained by the manager of the authorized source described.

In an embodiment, said unblock code comprises biometric data, for example a fingerprint or a facial recognition.

The ticket issuer, through the authorized source described, is any entity responsible for security or owner of a set of computer systems. For example, the user of the computer system, who can make use of the respective blocking module to force its blocking after the loss or theft thereof. Or a company, if it owns the computer system and it is subject to a contract wherein considerations from the user are stablished (e.g. Lease income, purchase instalments, etc.).

The hardware and software/firmware components that make up this security system comprise: Chipset with described module, Tickets, an Agent and a Server of the authorized source of tickets.

The Chipset with described module comprises a motherboard with hardware and software/firmware with the described control module. This module will be part of the list of modules that will be compiled when creating the software/firmware version that the computer system supplier will provide based on a previously established commercial agreement.

The described module comprises several criteria to prevent the computer system from booting, for example:
a. The time instant at which the boot is being performed. Boot can be prevented if one is outside a boot authorization time window. The authorized time window is always indicated by the current ticket. The current time instant, considered in the UTC reference, must be obtained from the machine's real-time clock or from another alternative real-time source of the computer system.
b. The number of boots performed with the same ticket. A ticket always specifies a maximum number of boots that it can authorize, it being impossible to use a ticket in a boot subsequently to it having already been used the maximum number of boots allowed.
c. The geographic position of the computer system. If it is possible to determine the geographical position of the computer system, for example, through a GPS system, and if the ticket has geographical restrictions (for example, only allowing boot in an area centered on an absolute coordinate, only allowing boot in one country, etc.).
d. Identity elements of the computer system owner specified in the ticket and which can be received by UEFI and compared with those in the ticket.

Tickets are authenticated data blocks with instructions for the described module.

In an embodiment, these instructions (communicated through tickets with the same name), which cause a change in the module state, are one of four states: START, NORMAL, BLOCK, FREEDOM.

START—activation of the described security module. If there is no activation, the module described in the UEFI will always be inactive, not acting during the boot of the computer system. The boot of the computer system cannot be controlled without occurring this activation.

NORMAL—extension of the time of use of the computer system without blockages if the conditions imposed by the ticket issuing entity for this to happen are verified.

BLOCK—immediate blocking order of the computer system due to failure to comply with the conditions imposed by the ticket issuing entity so that this does not happen. Once this ticket is accepted by the described module, the computer system will always go through the unblocking phase at its boot. To exit this mode, it is necessary to send a NORMAL or FREEDOM ticket to the described module.

FREEDOM—release of control of the computer system boot through its described module. The module described returns to its inactive state and the computer system is no longer under its control. This does not prevent the module from being able to be activated again later with a new START-type ticket.

A START ticket has a serial number that conditions the acceptance of other tickets in the future: they must have the same serial number. A START ticket has an authentication key AK, either symmetric or asymmetric, which must be used to authenticate future tickets that are inseminated in its replacement, or in the replacement of its substitutes.

A START ticket has a symmetric key UK (Unblocking Key) that should be used to validate unblocking codes if the module described has blocked the computer system at its boot and is requesting one of these codes.

A START ticket can only be inseminated if the described module is not already using another ticket to control the boot.

The Agent described is the software written for each type of operating system, for example, Windows™, Linux™, MacOS™, Android™, etc., with the aim of periodically requesting tickets to a server from the authorized source, and placing them in a transfer zone accessible to the described module when booting the computer system (e.g. UEFI data transfer zone). The assimilation of a new ticket by the module described is only done during booting of the computer system, when the module operates and takes decisions. Preferably the operating system is Windows™, Linux™ or Android™.

The Ticket Authorized Source Server is a service that controls the ticket issuing for the described module. It can be a personal or business service.

The module described only uses tickets that it can validate as coming from a recognized server. For such, tickets must preferably have:
a. Its structure correctly defined;
b. A serial number equal to the START ticket that activated the described module;

c. An authentication code (authenticator) validable with the authentication key AK indicated on the START ticket that activated the module described.

In an embodiment, validation is done with secret AK keys and MAC codes (Message Authentication Codes) or with asymmetric keys and digital signatures.

In the first case, the AK secret key is the one indicated on the START ticket and must also be used by the ticket issuer to generate its authenticator. MAC code calculation functions are based on secure digest functions, e.g. SHA-256, SHA-512, SHA-3, etc., applied according to constructions demonstrated to be secure (HMAC) to the set formed by the ticket (without the authenticator) and the secret key.

In the second case, with asymmetric keys and digital signatures, the AK key is the public component of a pair of asymmetric keys indicated on the START ticket. The corresponding private key should be used by the ticket issuer to generate its authenticator. The calculation and validation functions of digital signatures are based on secure digest functions, e.g. SHA-256, SHA-512, SHA-3, etc., the result of which is encrypted/decrypted with an asymmetric RSA cipher. The digest function is applied to the entire ticket excluding the authenticator.

A method for blocking a computer system based on tickets issued by a remote server (6) is described, with an operating system that is configured for booting from a UEFI (2), Unified Extensible Firmware Interface, wherein the blocking system comprises: a ticket transfer engine (10), i.e. an agent, comprised in an application or module of the operating system (3); an authentication engine (1), i.e., authentication and booting, comprised in said UEFI; a data or file transfer area (13) accessible by both transfer and authentication engines; wherein the method comprises:
  by the transfer engine, receiving tickets issued by the server and storing the received tickets in said transfer area;
  by the authentication engine:
    reading a ticket stored in said transfer area;
    verifying authenticity and obtaining type of ticket read;
    if the authentication is verified as authenticated, processing the verified ticket, depending on the type of ticket:
      a first type of ticket, referred to as normal ticket (408, 508), setting the system in a leased state (403, 503) wherein the authentication engine authorizes that the operating system may boot;
      a second type of ticket, referred to as block ticket (407, 507), setting the system in a blocked state (404, 504) wherein the authentication engine does not authorize that the operating system may boot except under predetermined exception conditions.

Also described is a system for blocking a computer system based on tickets issued by a remote server, wherein the computer system has an operating system that is configured for booting from a UEFI, Unified Extensible Firmware Interface, wherein the blocking system comprises:
  a transfer engine, i.e. an agent, of tickets comprised in an application or module of the operating system;
  an authentication, i.e. authentication and booting, engine comprised in said UEFI;
  a data or file transfer area that is accessible by both the transfer and authentication engines;
  wherein the transfer engine is configured for receiving tickets issued by the server and storing the received tickets in said transfer area;
  wherein the authentication engine is configured for:
    reading a ticket stored in said transfer area;
    verifying the authenticity (and usually also verifying the correctness, i.e. its compliance with its specification) of the read ticket and obtaining the type of the ticket read;
    if the authenticity is verified as authenticated, processing the verified ticket, depending on the type of ticket:
      a first type of ticket, referred to as normal ticket, setting the system in a leased state wherein the authentication engine authorizes that the operating system may boot;
      a second type of ticket, referred to as block ticket, setting the system in a blocked state wherein the authentication engine does not authorize that the operating system may boot except under predetermined exception conditions.

In an embodiment, the authentication engine is further configured for removing the already processed ticket from the transfer area.

In an embodiment, the authentication engine is configured to process the verified ticket, additionally, depending on the ticket type:
  a third type of ticket, referred to as freedom ticket (406, 506), setting the system in a free state (401, 501) wherein the authentication engine authorizes that the operating system may boot freely and indefinitely;
  a fourth type of ticket, referred to as start ticket (405, 505), setting the system in a leased state (403, 503) wherein the authentication engine authorizes that the operating system may boot provided that certain predetermined operating conditions are met.

In an embodiment, the authentication engine comprises a boot counter (UC) and is configured for incrementing the boot counter (UC) on each authorized booting of the operating system.

In an embodiment, the authentication engine is configured for setting the system in the blocked state, if the boot counter (UC) is greater than a predetermined maximum number of authorized boots (T·MaxUC).

In an embodiment, the authentication engine comprises an unblocking boot counter (UBC) and is further configured for, when setting the system in the blocked state and the computer system boots:
  setting the unblocking boot counter (UBC) to zero;
  displaying the boot counter (UC) to the user;
  requesting an unblocking code (509);
  waiting until receiving a user-submitted unblocking code;
  verifying that the unblocking code corresponds to the result of a calculated hash function including the boot counter (UC);
  if the result of the hash function matches, authorizing that the operating system may boot temporarily, incrementing the boot counter (UC).

In an embodiment, the authentication engine is further configured for:
  if the result of the hash function does not match, incrementing the unblocking boot counter (UBC);
  if the unblocking boot counter (UBC) is greater than a predetermined maximum number of authorized unblocking boots (MaxUBC), incrementing the boot counter (UC) and setting the system in the blocked state.

In an embodiment, the authentication engine is configured for setting the boot counter (UC) to zero when processing the verified ticket, wherein the ticket type is a normal ticket.

In an embodiment, the predetermined maximum number of authorized boots (T·MaxUC) is a predetermined maximum number of authorized boots received in the most recent normal ticket.

In an embodiment, the hash function includes the boot counter (UC), the computer system serial number (SN), the issuing time of the most recently received normal ticket (CT), and a specific authentication key to authenticate unblocking codes (UK).

In an embodiment, each ticket includes its ticket type, the computer system serial number (SN), a predetermined maximum number of authorized boots (T·MaxUC), a specific authentication to authenticate tickets (AK), wherein the ticket type includes the start ticket, normal ticket, block ticket or freedom ticket.

In an embodiment, each ticket further includes a ticket issuing time (CT) and a maximum time threshold (LD+TW) of use.

In an embodiment, each start ticket further includes a specific authentication key to authenticate unblocking codes (UK).

In an embodiment, the authentication engine comprises a boot counter (UC) and is configured for incrementing the boot counter (UC) on each authorized booting of the operating system.

In an embodiment, the authentication engine is configured for ignoring received tickets, even if authenticated, with a ticket issuing time value prior to the most recently received ticket.

In an embodiment, the authentication engine is configured for setting the system in the blocked state if the computer system clock is greater than a maximum time threshold (LD+TW) received in the most recent normal ticket.

In an embodiment, the authentication engine is configured for setting the computer system clock equal to the ticket issuing time if the computer system clock is less than a ticket issuing time value, received in the most recent normal ticket.

In an embodiment, the received ticket is authenticated by a secret symmetric key received in the most recent start ticket or is authenticated by an asymmetric key pair in which a private key is stored by the server and a corresponding public key is stored in the authentication engine.

In an embodiment, the authentication and boot engine is comprised in a UEFI driver.

BRIEF DESCRIPTION OF THE SEVERAL VIEWS OF THE DRAWINGS

For an easier understanding, figures are herein attached, which represent preferred embodiments which are not intended to limit the object of the present description.

DESCRIPTION OF SPECIFIC EMBODIMENTS OF THE INVENTION

Figure 1:
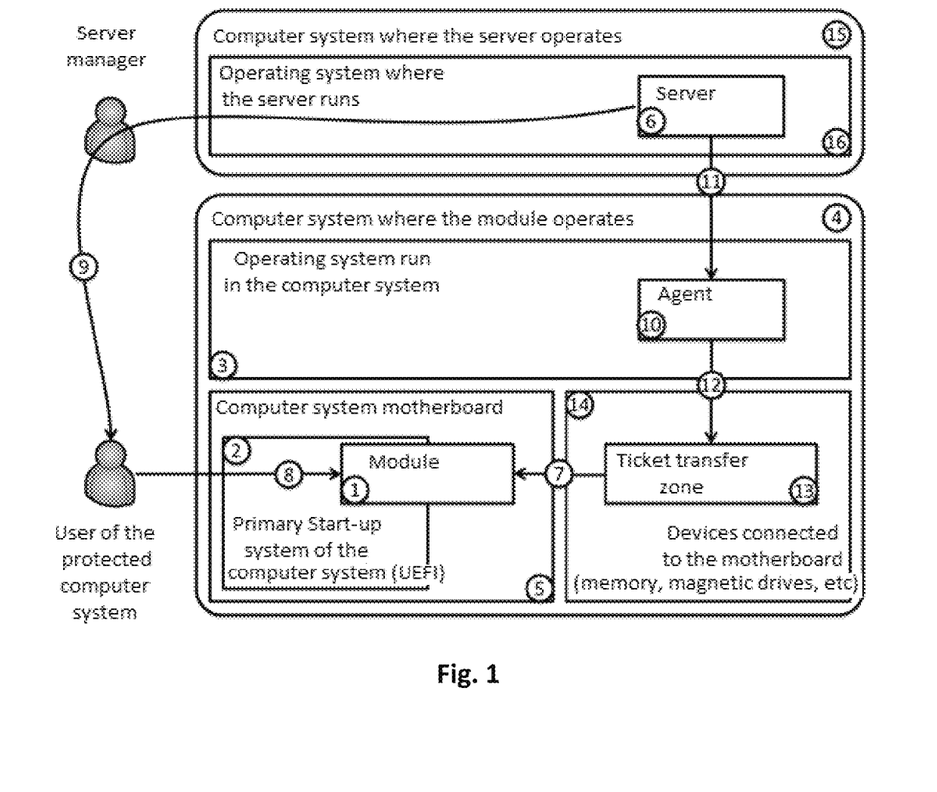
FIG. 1: Schematic representation of a computer blocking system architecture.

FIG. 1 shows a schematic representation of a computer blocking system architecture, where 1 represents a module as described herein, 2 represents a primary boot system of the computer system, 3 represents an operating system that runs on the computer system, 4 represents a computer system where the described module operates, 5 represents a motherboard of the computer system, 6 represents a server of the described authorized ticket source, 7 represents a ticket sent by the ticket transfer zone, 8 represents a temporary unblocking code sent by the user of the protected computer system, 9 represents a temporary unblocking code sent by a manager of the described server, 10 represents a described agent, 11 represents a ticket sent by the described server, 12 represents a ticket sent by the described agent, 13 represents a ticket transfer zone, 14 represents devices connected to the motherboard, 15 represents a computer system where the described server operates, and 16 represents an operating system on which the described server runs.

The various entities involved in the protection process are also referenced: the user of the protected computer system (4), the computer system where the described server operates (15), providing tickets to keep the protected computer running, and the manager of the described server, which manages ticket supply policies.

Figure 2:
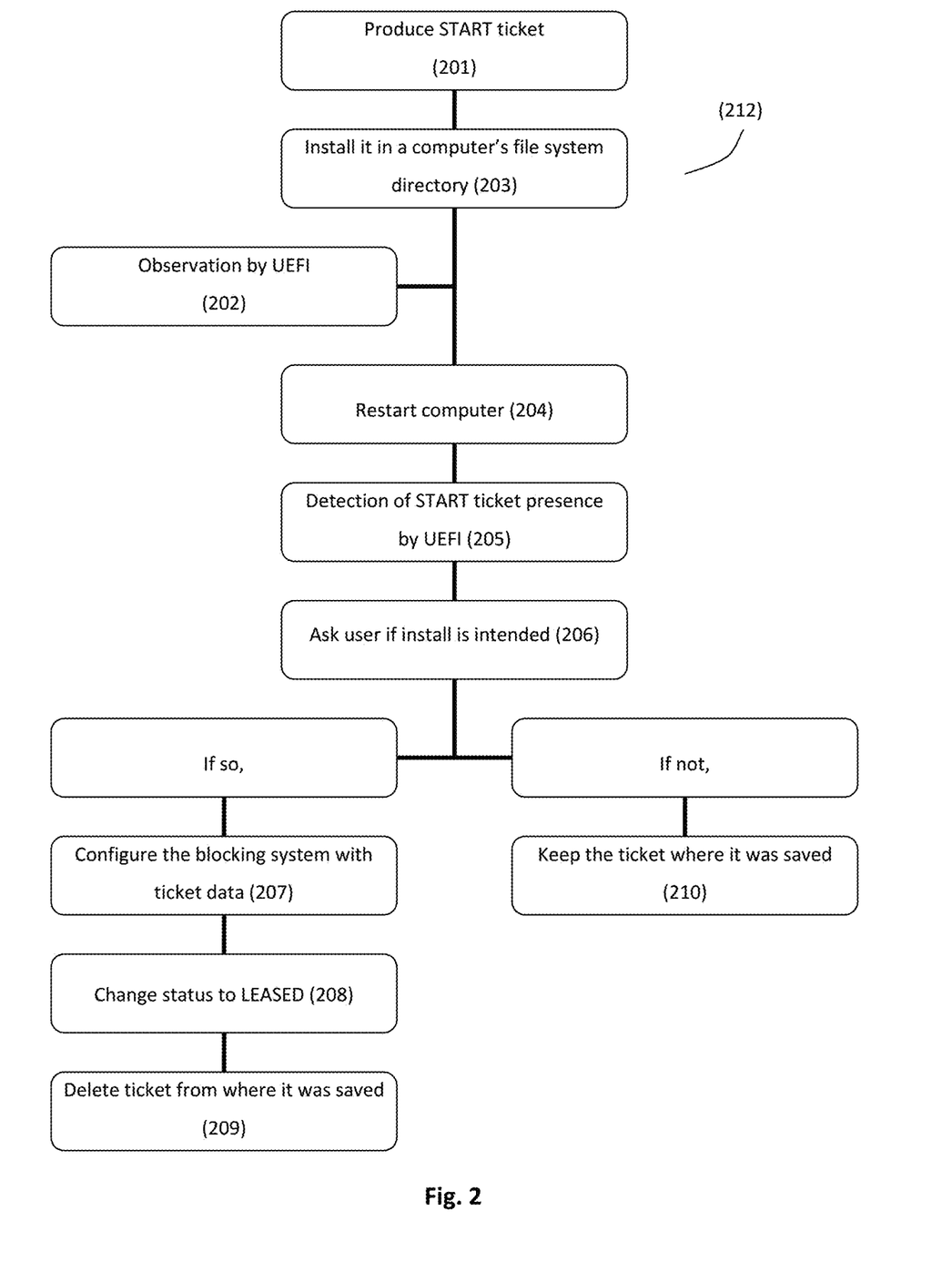
FIG. 2: Flowchart of the method for configuring a computer with said blocking system from a free state to a state under control.

FIG. 2 shows a flowchart of the method of configuring a computer with said blocking system from a free state to a controlled state, respectively named as a "FREE" state and "LEASED" state.

The configuration method (212) may comprise the following steps:
1. Producing a START ticket (201);
2. Installing in a computer's file system directory (203), which is observed by the UEFI (202);
3. Restarting the computer (204);
4. Detecting the START ticket presence by the UEFI (205);
5. Asking the user if install is intended (206):
   a. If confirmation is given,
      i. Configuring the blocking system with ticket data (207);
      ii. Changing status to LEASED (208);
      iii. Deleting ticket from where it was saved (209);
   b. If confirmation is not given,
      i. Keeping the ticket where it was saved (210).

In an embodiment, an off-the-shelf computer from the original equipment manufacturer has the blocking system in the FREE state.

In an embodiment, a computer that was purchased under a phased payment contract, its blocking system is configured from a FREE state to a LEASED state.

Figure 3:
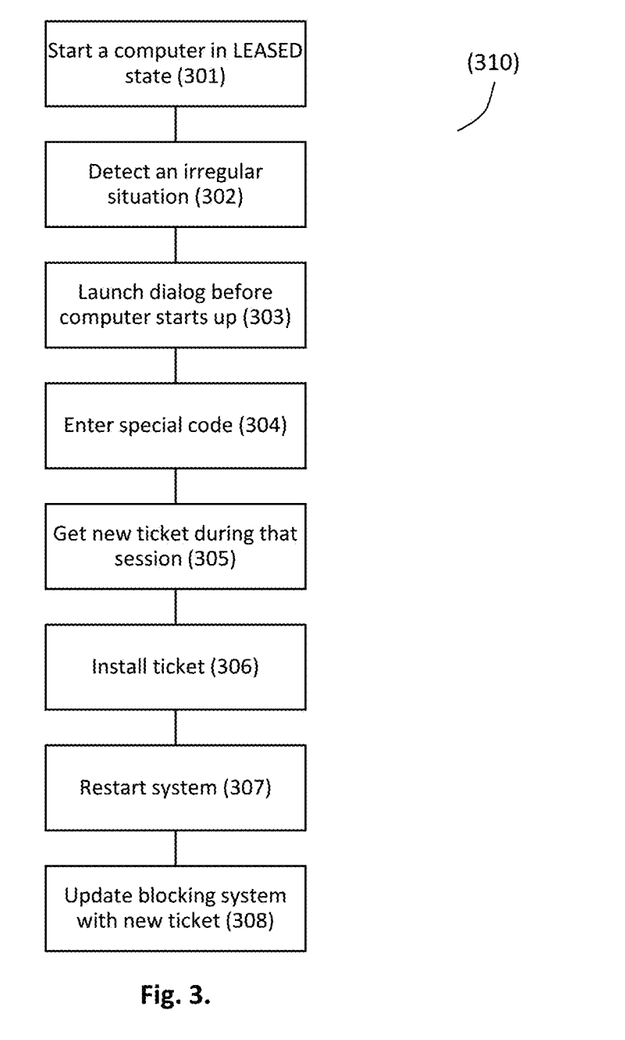
FIG. 3: Flowchart of the blocking method when the maximum limit of boots with the same ticket is detected or when the deadline for its use has been exceeded and the respective system update with a new ticket.

FIG. 3 shows a flowchart of the blocking method when the maximum limit of boots with the same ticket is detected or when the deadline for its use is exceeded and the respective system update with a new ticket.

The blocking method (310) may comprise the following steps:
1. Starting a computer in the LEASED state (301);
2. Detecting an irregular situation (302) such as: reaching a maximum number of boots with the same ticket (indicated thereon), exceeding the limit date for its use (also indicated on the ticket) or receiving a block ticket;
3. Launching dialog before computer boots (303);
4. Entering a special code (304) provided by the company that controls ticket issuing;
5. Getting new ticket during that session (305) on that same computer;
6. Installing the ticket (306) in the file system directory of the computer associated with the blocking system;

7. Restarting the system (307);

8. Updating blocking system with the new ticket (308).

The special code (304) serves only to be able to perform booting that time, and no more, and has the sole purpose of allowing the user to obtain a new ticket to update the blocking system.

In an embodiment, said blocking method (310) is activated for all computer equipment in the LEASED state.

For a user not to be frequently faced with the blocking scenario (310), he should obtain his tickets in due time, with an adequate frequency if he restarts the computer many times.

In order to avoid blocking (310), a valid ticket must be obtained and installed before restarting the computer.

In an embodiment, an entity managing ticket issuing only provides tickets after confirming that an agreed instalment payment protocol is being met.

In an embodiment, this blocking method (310) is disabled by the entity that manages the tickets for a given computer, thus ending its control process over that computer. In this case, when the computer user gets a new ticket, it will change the state of the blocking system from LEASED to FREE on the next computer boot.

In an embodiment, this blocking method (310) can be activated by a block ticket (BLOCK) issued by an entity that manages the tickets for a given computer in case of non-compliance with the agreed contract.

A BLOCK ticket, once observed by UEFI on a boot, prevents the computer from booting and takes it back to the dialog where a special booting code is requested.

A method is described for controlling booting of an operating system on a computer using a component/module (1) activated during the primary boot process of the computer system (2), managed by UEFI (Unified Extensible Firmware Interface) and without any interaction, in this phase, with entities external to the computer system. From now on, this component/module is generically referred to as the described module (1). The described module can be implemented with specific hardware for the purpose or with a combination of general-purpose hardware existing in operating systems and software/firmware, either installed on devices (firmware) or as part of the software executed by UEFI.

A method to allow to decide, autonomously, if the described module (1) allows or not to proceed with the booting of the computer system (4) is also described. The described module uses internal credentials, previously inseminated (7), called tickets, to make the decision whether or not to allow the boot of an operating system (3) in the computer system.

A method to avoid the reuse of tickets is also described. The tickets used by the module described (1) are specific to each computer system. Each ticket is only valid for one and only one computer system (5). The described module never installs a ticket that is not intended therefor, unless it is a special activation ticket for the described module (START ticket).

The module described (1) can use various criteria to prevent the computer system from booting, including exceeding a certain time indicated on the current ticket (taking into account the time of the real time clock of the computer system), exceeding of the successive number of boots with the same ticket (this limit is indicated on the current ticket itself), the location of the computer system, given by a GPS equipment, outside the limits stipulated by the current ticket, or the identity of the user who is booting the computer system, taking into account the identities authorized by the current ticket.

A method for temporarily booting the computer system, after an impediment to such boot due to inability to comply with the requirements imposed by a ticket used by the described module is additionally described. The method involves introducing a temporary unblocking code (8) which is obtained from the entity (6) managing ticket issuing for the relevant computer system. The form of contact with the entity (9) that has the responsibility of issuing temporary unblocking codes is in no way covered by this patent. The temporary unblocking code (8) can only be used successfully once, and only on the computer system for which it was issued. The unblocking code is generated and validated with the UK key (Unblocking Key), which is known both by the described server (6) and by the described module (1).

Also described is a method to activate the described module (1), causing it to leave an inactive state. Such activation is done through the insemination of a valid START ticket (7) in the described module. The user of the computer system is asked about his agreement with this insemination and may abort it.

A method to deactivate the described module (1) is also described. Such deactivation is done through the insemination of a valid FREEDOM ticket (7) in the described module.

A method for explicitly requesting the blocking of the computer system by the module described (1) is also described. Such blocking is done through the insemination of a valid BLOCK ticket (7) in the described module. After inseminating this ticket, the computer system, when booting, shall enter a blocking mode that it will only exit with the previously indicated temporary boot code (8), after which it may be possible to inseminate a ticket (7) that removes it from such blocked state.

A method for extending the exploration of the computer system, allowing it to pass the conditions imposed on the described module (1) is also described. This extension is done through the insemination of valid NORMAL tickets (7) in the module described. A NORMAL ticket can change the conditions previously used in the boot control (time limit, number of boots, location, user identification).

A method for inseminating new tickets in the described module (1) is also described. The insemination takes place in two phases: in the first phase, a described agent (an application that runs on the operating system of the machine (10)) obtains a ticket (11) and sets it (12) in a pre-agreed transfer zone (13), accessible both to the operating system and to the module described. In the second phase, the module described, in its execution when booting the computer system, verifies if there is a new valid ticket in that transfer zone (13) and, after a successful validation, saves its value, finalizing the insemination (7).

A method for validating tickets to be inseminated when the described module is active is also described. The tickets must have a correct structure, a correct serial number and a valid authenticator taking into account the known AK key of the described module.

Also described is a method to control attempts to violate the internal state and code of the module described (1). Both the internal state and the code ran by the described module cannot be changed if it is active, that is, it has been inseminated with a START ticket and has not yet been inseminated with a FREE ticket. If any of the circumstances referred to above are verified, the module described blocks booting from proceeding, immediately turning off the computer system.

In an embodiment, there are 4 ticket types that can be issued: START, NORMAL, FREEDOM and BLOCK. The START ticket is used to move the blocking system from the FREE state to the LEASED state, the NORMAL ticket allows a computer to boot in the LEASED state, the FREEDOM ticket allows changing from the LEASED to FREE state, and the BLOCK ticket allows forcing the block at booting, if the equipment was previously in the LEASED state.

In an embodiment, the computer or IT equipment needs authorization from the user and the ticket issuing entity to switch from the FREE state to the LEASED state.

Figure 4:
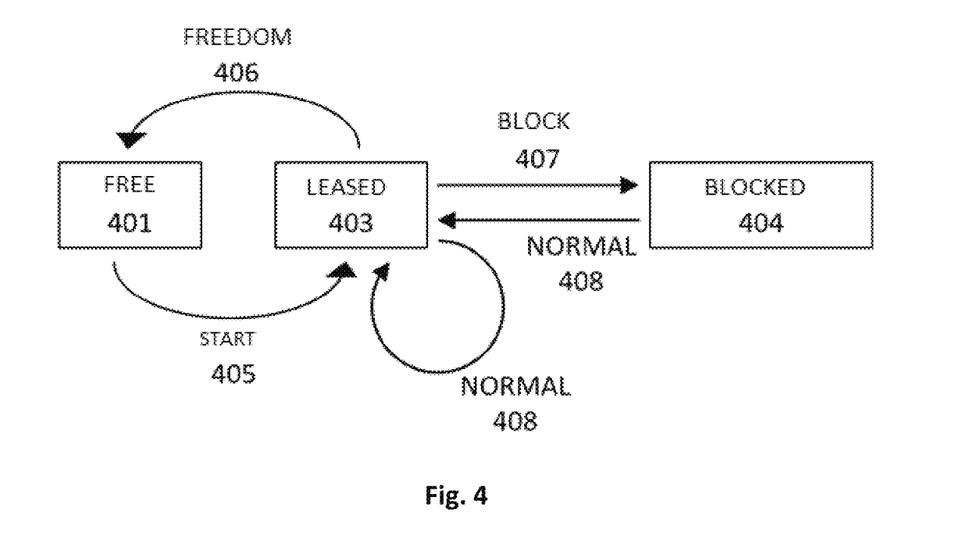
FIG. 4: Schematic representation of ticket states and computer system states.

FIG. 4 shows a schematic representation of the states of the tickets and the states of the computer system, where 401 represents the FREE state of the computer system, 403 represents the LEASED state of the computer system, 404 represents a BLOCKED state, 405 represents a START ticket, 406 represents a FREEDOM ticket, 407 represents a BLOCK ticket, and 408 represents a NORMAL ticket.

Figure 5:
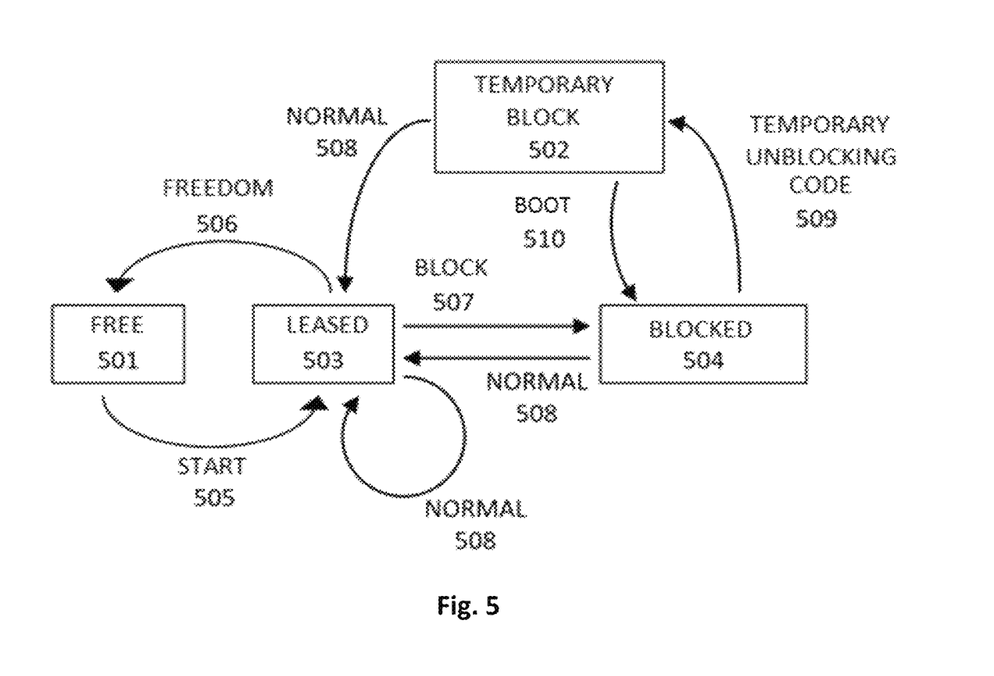
FIG. 5: Detailed schematic representation of ticket states and computer system states.

FIG. 5 shows a more detailed schematic representation of the ticket states and the computer system states, where 501 represents the FREE state of the computer system, 502 represents the UNBLOCKING (Temporary) substate of the blocked state, 503 represents the LEASED state of the computer system, 504 represents a BLOCKED state, 505 represents a START ticket, 506 represents a FREEDOM ticket, 507 represents a BLOCK ticket, 508 represents a NORMAL ticket, 509 represents a TEMPORARY UNBLOCKING CODE that only allows a temporary boot of the computer system, 510 represents a temporary boot of the system that returns the system to the blocked state, unless a NORMAL ticket (508) is received in the meantime making the system transit to the LEASED state (503).

APPLICATION EXAMPLES

The authorization to boot a computer system is intended to prevent it from being used in conditions that violate the requirements of the owner of the equipment. There are three scenarios of particular interest for the application of this description: in the leasing of computer systems, in the sale of computer systems on instalments and in retaliation in case of theft of the computer system.

In the computer system leasing scenario, there is an entity leasing a computer system that wants to ensure that whoever leases it does not fail to do so without first returning the computer system. In this case, the leasing entity pre-installs a START ticket in the computer system before assigning it under lease, and controls its use, through boot authorizations given by NORMAL tickets, if the contractual conditions of the lease are not violated. In more serious cases, the hirer can issue a BLOCK ticket, limiting more drastically the time of use of the computer system after verifying a situation considered anomalous.

The scenario of selling computer systems on instalments is similar to the previous one, but ownership of the computer system belongs to the user.

In the retaliation scenario in case of theft of the computer system, the user can use this system to ensure that his computer system enters in blocking state, after a finite number of boots, after being stolen. This solution does not protect the user against theft of data on the computer system, nor against its reuse for other purposes, but it guarantees that the base infrastructure of the computer system, its motherboard, will only boot a finite number of times. If there is recovery by the legitimate owner, the computer system can be unblocked through the actions previously described: introduction of unblocking code for temporary boot of the operating system, introduction of a NORMAL ticket in the described module through the described agent.

The term "comprises" or "comprising" when used herein is intended to indicate the presence of the features, elements, integers, steps and components mentioned, but does not preclude the presence or addition of one or more other features, elements, integers, steps and components, or groups thereof.

The present invention is of course in no way restricted to the embodiments described herein and a person of ordinary skill in the art can foresee many possibilities of modifying it and replacing technical features with equivalents depending on the requirements of each situation as defined in the appended claims.

The following claims define additional embodiments of the present description.

The invention claimed is:

1. Method for blocking a computer system based on tickets issued by a remote server, with an operating system that is configured for booting from a UEFI, Unified Extensible Firmware Interface, wherein the blocking system comprises: a ticket transfer engine comprised in an application or module of the operating system; an authentication engine comprised in said UEFI; a data or file transfer area accessible by both transfer and authentication engines; wherein the method comprises:
  by the transfer engine, receiving tickets issued by the server and storing the received tickets in said transfer area;
  by the authentication engine:
    reading a ticket stored in said transfer area;
    verifying authenticity and obtaining type of ticket read;
    if the authentication is verified as authenticated, processing the verified ticket, depending on the type of ticket:
    a first type of ticket, referred to as normal ticket, setting the system in a leased state wherein the authentication engine authorizes that the operating system may boot;
    a second type of ticket, referred to as block ticket, setting the system in a blocked state wherein the authentication engine does not authorize that the operating system may boot except under predetermined exception conditions.

2. Method according to claim 1, comprising the authentication engine removing the already processed ticket from the transfer area; and/or comprising the authentication engine processing the verified ticket depending on the type of ticket:
  a third type of ticket, referred to as freedom ticket, setting the system in a free state wherein the authentication engine authorizes that the operating system may boot freely and indefinitely;
  a fourth type of ticket, referred to as start ticket, setting the system in a leased state wherein the authentication engine authorizes that the operating system may boot provided that certain predetermined operating conditions are met;
  and/or the authentication engine incrementing a boot counter (UC) on each authorized booting of the operating system.

3. Method according to claim 1, comprising, if the boot counter (UC) is greater than a predetermined maximum number of authorized boots (T·MaxUC), the authentication engine setting the system in the blocked state; and/or comprising the authentication engine, when setting the system in the blocked state and the computer system boots:

setting an unblocking boot counter (UBC) to zero;
displaying the boot counter (UC) to the user;
requesting an unblocking code;
waiting until receiving a user-submitted unblocking code;
verifying whether the unblocking code corresponds to a calculated hash function including the boot counter (UC);
if the hash function matches, authorizing that the operating system may boot temporarily (502), incrementing the boot counter (UC); and/or comprising the authentication engine:
if the result of the hash function does not match, incrementing the unblocking boot counter (UBC);
if the unblocking boot counter (UBC) is greater than a predetermined maximum number of authorized unblocking boots (MaxUBC), incrementing the boot counter (UC) and setting the system in the blocked state (504).

4. Method according to claim 3, comprising the authentication engine:
if the result of the hash function does not match, incrementing the unblocking boot counter (UBC);
if the unblocking boot counter (UBC) is greater than a predetermined maximum number of authorized unblocking boots (MaxUBC), incrementing the boot counter (UC) and setting the system in the blocked state (504).

5. Method according to claim 1, wherein the predetermined maximum number of authorized boots (T·MaxUC) is a predetermined maximum number of authorized boots received in the most recent normal ticket;
and/or comprising the authentication engine, when processing the verified ticket, wherein the ticket type is a normal ticket, setting the boot counter (UC) to zero;
and/or wherein the hash function includes the boot counter (UC), the computer system serial number (SN), the issuing time of the most recently received normal ticket (CT), and a specific authentication key to authenticate unblocking codes (UK).

6. Method according to claim 1, wherein each ticket includes its ticket type, the computer system serial number (SN), a predetermined maximum number of authorized boots (T·MaxUC), an authentication key specific to authenticate tickets (AK), wherein the type of ticket includes the start ticket, normal ticket, block ticket or freedom ticket; or additionally where each ticket also includes a ticket issuing time (CT) and a maximum time threshold (LD+TW) of use; or additionally wherein each ticket further includes a specific authentication key to authenticate unblocking codes (UK).

7. Method according to claim 1, comprising the authentication engine ignoring received tickets, even if authenticated, with a ticket issuing time value prior to the most recently received ticket; and/or the authentication engine setting the system in the blocked state if the computer system clock is greater than a maximum time threshold (LD+TW) received in the most recent normal ticket; and/or the authentication engine setting the computer system clock equal to the ticket issuing time if the computer system clock is less than a ticket issuing time value, received in the most recent normal ticket.

8. Method according to claim 1, wherein the received ticket is authenticated by a secret symmetric key received in the most recent start ticket or is authenticated by an asymmetric key pair wherein a private key is stored by the server and a corresponding public key is stored in the authentication engine.

9. Method according to claim 1 wherein the authentication and boot engine is comprised in a UEFI driver.

10. Blocking system and respective computer system, based on tickets issued by a remote server with an operating system configured for booting from a UEFI, Unified Extensible Firmware Interface, comprised in said computer system, wherein the blocking system comprises:
a ticket transfer engine comprised in an application or module for the operating system; an authentication engine comprised in said UEFI; a data or file transfer area accessible by both the transfer and authentication engines;
wherein the transfer engine is configured for receiving tickets issued by the server and store the received tickets in said transfer area;
wherein the authentication engine is configured for: reading a ticket stored in said transfer area; verifying authenticity and obtaining the type of ticket read; if the authenticity is verified as authenticated, processing the verified ticket, depending on the type of ticket:
a first type of ticket, referred to as normal ticket, setting the system in a leased state wherein the authentication engine authorizes that the operating system may boot;
a second type of ticket, referred to as block ticket, setting the system in a blocked state wherein the authentication engine does not authorize that the operating system may boot except under predetermined exception conditions.

11. System according to claim 10, wherein the authentication engine is further configured for removing the already processed ticket from the transfer area; and/or processing the verified ticket depending on the type of ticket:
a third type of ticket, referred to as freedom ticket, setting the system in a free state wherein the authentication engine authorizes that the operating system may boot freely and indefinitely;
a fourth type of ticket, referred to as start ticket, setting the system in a leased state wherein the authentication engine authorizes that the operating system may boot provided that certain predetermined operating conditions are met.

12. System according to claim 10 wherein the authentication engine comprises a boot counter (UC) and is configured for incrementing the boot counter (UC) on each authorized booting of the operating system; and/or wherein the authentication engine is configured for setting the system in the blocked state if the boot counter (UC) is greater than a predetermined maximum number of authorized boots (T·MaxUC).

13. System according to claim 10, wherein the authentication engine comprises an unblocking boot counter (UBC) and is further configured for, when setting the system in the blocked state and the computer system boots:
setting the unblocking boot counter (UBC) to zero;
displaying the boot counter (UC) to the user;
requesting an unblocking code;
waiting until receiving a user-submitted unblocking code;
verifying that the unblocking code corresponds to the result of a calculated hash function including the boot counter (UC);
if the result of the hash function matches, authorizing that the operating system may boot temporarily, incrementing the boot counter (UC); and/or wherein the authentication engine is further configured for:
if the result of the hash function does not match, incrementing the unblocking boot counter (UBC);
if the unblocking boot counter (UBC) is greater than a predetermined maximum number of authorized unblocking boots (MaxUBC), incrementing the boot counter (UC) and setting the system in the blocked state.

14. System according to claim 10, wherein the authentication engine is configured for setting the boot counter (UC) to zero when processing the verified ticket, wherein the ticket type is a normal ticket; and/or wherein the predetermined maximum number of authorized boots (T·MaxUC) is a predetermined maximum number of authorized boots received in the most recent normal ticket.

15. System according to claim 10, wherein the hash function includes the boot counter (UC), the computer system serial number (SN), the issuing time of the most recently received normal ticket (CT), and a specific authentication key to authenticate unblocking codes (UK).

16. System according to claim 10, wherein each ticket includes its ticket type, the computer system serial number (SN), a predetermined maximum number of authorized boots (T·MaxUC), a specific authentication to authenticate tickets (AK), where the ticket type includes the start ticket, normal ticket, block ticket or freedom ticket; and/or wherein each ticket further includes a ticket issuing time (CT) and a maximum time threshold (LD+TW) of use; and/or wherein each start ticket further includes a specific authentication key to authenticate unblocking codes (UK).

17. System according to claim 10, wherein the authentication engine comprises a boot counter (UC) and is configured for incrementing the boot counter (UC) on each authorized booting of the operating system; and/or wherein the authentication engine is configured for ignoring received tickets, even if authenticated, with a ticket issuing time value prior to the most recently received ticket; and/or wherein the authentication engine is configured for setting the system in the blocked state if the computer system clock is greater than a maximum time threshold (LD+TW) received in the most recent normal ticket; and/or wherein the authentication engine is configured for setting the computer system clock equal to the ticket issuing time if the computer system clock is less than a ticket issuing time value, received in the most recent normal ticket.

18. System according to claim 10, wherein the authentication and boot engine is comprised in a UEFI driver.

19. A non-transient computer readable medium including a computer program for implementing a method for blocking a computer system based on tickets issued by a remote server comprising instructions which, when the program is run by a computer, cause the computer to run the method of claim 1.

* * * * *

UNITED STATES PATENT AND TRADEMARK OFFICE
CERTIFICATE OF CORRECTION

Page 1 of 1

PATENT NO. : 12,346,456 B2
APPLICATION NO. : 18/849682
DATED : July 1, 2025
INVENTOR(S) : João Gabriel Ferreira Dos Santos et al.

It is certified that error appears in the above-identified patent and that said Letters Patent is hereby corrected as shown below:

On the Title Page

Add Item (30) Foreign Application Priority Data after Item (65):
-- Mar 22, 2022 (PT) ........................117865 --

Signed and Sealed this
Thirtieth Day of December, 2025

John A. Squires
*Director of the United States Patent and Trademark Office*